United States Patent
Raje et al.

(10) Patent No.: US 6,878,655 B2
(45) Date of Patent: Apr. 12, 2005

(54) METHOD AND APPARATUS FOR THE REGENERATION OF HYDROCARBON SYNTHESIS CATALYSTS

(75) Inventors: Ajoy P. Raje, Stillwater, OK (US); Rafael L. Espinoza, Ponca City, OK (US); Jack E. Cnossen, Ponca City, OK (US); Sergio R. Mohedas, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 374 days.

(21) Appl. No.: 10/251,139

(22) Filed: Sep. 20, 2002

(65) Prior Publication Data

US 2004/0059008 A1 Mar. 25, 2004

(51) Int. Cl.[7] ............................ B01J 20/34; B01J 38/10; C07C 27/00
(52) U.S. Cl. ........................ 502/53; 518/700; 518/709
(58) Field of Search ........................ 502/53; 518/700, 518/709

(56) References Cited

U.S. PATENT DOCUMENTS

| | | | | |
|---|---|---|---|---|
| 5,770,629 A | * | 6/1998 | Degeorge et al. | 518/700 |
| 5,811,469 A | * | 9/1998 | Leviness et al. | 518/700 |
| 5,827,903 A | * | 10/1998 | White et al. | 518/710 |
| 5,844,005 A | | 12/1998 | Bauman et al. | 518/700 |
| 6,043,288 A | | 3/2000 | DeGeorge et al. | 518/715 |
| 6,107,353 A | * | 8/2000 | Koveal et al. | 518/705 |
| 6,403,660 B1 | * | 6/2002 | Espinoza et al. | 518/700 |
| 6,720,358 B2 | * | 4/2004 | Espinoza et al. | 518/700 |

FOREIGN PATENT DOCUMENTS

| | | | |
|---|---|---|---|
| EP | 0 533 228 A1 | 3/1993 | ............. C07C/1/04 |
| WO | WO 97/17137 | 5/1997 | ............. B01J/37/18 |
| WO | WO 02/083817 | 10/2002 | ............. C10G/2/00 |

OTHER PUBLICATIONS

European International Search Report for European Application No. EP 03 25 5907, dated Feb. 12, 2004 (3 p.).

Article entitled *"Study of effect of water on alumina supported cobalt Fischer–Tropsch catalysts,"* by A.M. Hilmen et al., Elsevier, Applied Catalysts A: General 186, pp. 169–188, 1999.

\* cited by examiner

*Primary Examiner*—Stanley S. Silverman
*Assistant Examiner*—Jonas N. Strickland
(74) *Attorney, Agent, or Firm*—Conley Rose P.C.

(57) ABSTRACT

The present invention is generally related towards the regeneration of hydrocarbon synthesis catalysts. In particular, the present invention is directed towards the regeneration of deactivated Fischer-Tropsch type catalysts using a two step process wherein the catalyst is first prepared using a dry gas and then regenerated using a hydrogen rich gas. The regeneration process is carried out at temperatures and pressures that are generally different than the operating temperatures and pressures for a typical hydrocarbon synthesis reaction.

100 Claims, 3 Drawing Sheets

Figure 3. Relative CO Conversions during Catalyst Deactivation in Example 1

Figure 4. Relative CO Conversions during Catalyst Deactivation in Example 3

METHOD AND APPARATUS FOR THE REGENERATION OF HYDROCARBON SYNTHESIS CATALYSTS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is generally related towards the field of converting hydrocarbon gas to liquid hydrocarbons. In particular, the present invention provides a new and improved method and apparatus for preparing the liquid hydrocarbons from synthesis gas. More particularly, the present invention provides a method for the regeneration of deactivated hydrocarbon synthesis catalysts.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into hydrocarbons.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons.

More specifically, the Fischer-Tropsch reaction is the catalytic hydrogenation of carbon monoxide to produce any of a variety of products ranging from methane to higher alkanes and aliphatic alcohols. It is the catalytic nature of the Fischer-Tropsch reaction that makes the process economically feasible. Catalysts desirably have the function of increasing the rate of a reaction without being consumed by the reaction. Common catalysts for use in the Fischer-Tropsch process contain at least one metal from Groups 8, 9, or 10 of the Periodic Table (in the new IUPAC notation, which is used throughout the present specification).

Catalyst systems often employ a promoter in conjunction with the principal catalytic metal. A promoter typically improves one or more measures of the performance of a catalyst, such as activity, stability, selectivity, reducibility, or regenerability. For example, ruthenium, rhenium, and platinum are known to increase the reducibility of cobalt.

Further, in addition to the catalytic metal, a Fischer-Tropsch catalyst often includes a support material. The support is typically a porous carrier that provides mechanical strength and a high surface area in which the catalytic metal and any promoter(s) may be deposited. Catalyst supports for catalysts used in Fischer-Tropsch synthesis of hydrocarbons have typically been refractory oxides (e.g., silica, alumina, titania, zirconia or mixtures thereof).

After a period of time in operation, a catalyst may become deactivated, losing its effectiveness for catalyzing the desired reaction to a degree that makes the process uneconomical at best and inoperative at worst. The more deactivated a particular catalyst is, the less efficient the catalyst is at enhancing the rate of the desired reaction. At this point, the catalyst can be either replaced or regenerated. Replacement of catalyst could be quite expensive due to the loss of expensive metals and cost of making a replacement catalyst. For these reasons, regeneration is preferred over replacement.

Traditionally, regeneration methods for Fischer-Tropsch catalysts have used operating conditions similar to the Fischer-Tropsch operating conditions. However, this approach limits the scope of catalysts that can be effectively regenerated to those for which regeneration at operating conditions is possible, such as those deactivated by ammonia or hydrogen cyanide poisoning or to some extent, surface condensation of heavy wax products.

Hence, there is still a great need to identify new regeneration methods, particularly methods that can effectively regenerate Fischer-Tropsch catalysts without having to replace the catalysts and without significant downtime or loss of production. Also, there is a need for regeneration methods that can regenerate Fischer-Tropsch catalysts that have been deactivated by a variety of deactivation mechanisms.

SUMMARY OF THE INVENTION

The present invention relates generally to the regeneration of hydrocarbon synthesis catalysts. In particular, the present invention is directed toward the regeneration of deactivated Fischer-Tropsch type catalysts using a dry hydrogen rich gas. The regeneration of the Fischer-Tropsch catalysts is accomplished by contacting the deactivated catalyst material with the dry hydrogen rich gas at elevated temperature and relatively low pressure, i.e., conditions that are generally different than those of the Fischer-Tropsch operating conditions. Several embodiments are preferred, including both methods and apparatus for carrying out the present invention.

In general, the preferred method comprises locating the catalyst material in a vessel, such as a hydrocarbon synthesis reactor or any vessel capable of enduring the regeneration process, preparing the deactivated catalyst by removing all or substantially all of the water present in the catalyst slurry, and contacting the deactivated catalyst material with a hydrogen rich gas under the appropriate conditions. In addition, it is preferred that the concentration of the solids remain relatively stable throughout the process. Thus, additional liquid, preferably heavy hydrocarbons, may be added to maintain the solids concentration.

The regeneration vessel is comprised preferably of any vessel capable of withstanding the temperature and pressures of the regeneration process. The capacity of the regeneration vessel will depend on the plant design and potential frequency of use of the vessel. In addition, the vessel size and capacity may vary depending upon the use of a storage or blending tank as an intermediate vessel between the synthesis reactor and regeneration vessel.

The operating conditions for the overall process are generally different than a Fischer-Tropsch process. The preferred temperature for the water removal process is greater than about 210° C. with a preferred pressure of greater than about 50 psia but preferably equal to or lower than the Fischer-Tropsch reactor operating pressure. Likewise, the regeneration reaction is preferably carried out at temperatures in excess of about 220° C. and pressures greater than 50 psia. The duration of the regeneration processes can be from about 0.5 to about 48 hours.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

There are shown in the Figures and drawings, and herein will be described in detail, specific embodiments of the present invention with the understanding that the present disclosure is to be considered an exemplification of the principles of the invention, and is not intended to limit the invention to that illustrated and described herein. The present invention is susceptible to embodiments of different forms or order and should not be interpreted to be limited to the particular structures or compositions contained herein. In particular, various embodiments of the present invention provide a number of different configurations of the overall gas to liquid conversion process.

The present invention is directed toward an improved method for regenerating Fischer-Tropsch catalysts. The regeneration process involves the stripping off of water, dissolved gases and small, trapped bubbles containing various gases such as water, CO, light hydrocarbons, etc. from the catalyst slurry that can form during the Fischer-Tropsch reaction. After stripping, the catalyst is contacted with a hydrogen rich gas that reduces and/or reactivates the catalyst material. Regeneration of Fischer-Tropsch catalysts in accordance with the present invention can recapture a significant amount, if not all, of the lost catalyst activity of the deactivated catalyst material.

It has been discovered that the regeneration process is enhanced due to a pretreatment of the slurry in which a "dry" gas is introduced into the vessel. It is believed that the stripping step has two primary functions. One is to remove all or substantially all of the water that may be dissolved in the slurry mixture, i.e., water dissolved in the Fischer-Tropsch waxes, and also remove adsorbed water from the surface of the catalyst material. Another function of the stripping step is to remove dissolved gases and small entrained bubbles within the slurry. After stripping, the deactivated catalyst slurry should comprise less than 10 mole % water, preferably less than 5 mole % and still more preferably less than 1 mole %. Thus, the stripping gas should also comprise less than 10 mole % water, preferably less than 5 mole % and still more preferably less than 1 mole %.

One advantage of the present invention is that the method allows simultaneously treatment and/or regeneration of Fischer-Tropsch catalysts that have been deactivated by one or more of a variety of mechanisms, including but not limited to oxidation of catalytically active material, poisoning and surface condensation of heavy Fischer-Tropsch waxes. Further, the present invention naturally provides an improved method for Fischer-Tropsch production and ultimately an improved method for the conversion of hydrocarbon gas to liquids. The preferred embodiments for all of the present invention's methods as well as a preferred embodiment for a regeneration apparatus are described herein.

Figure 1:
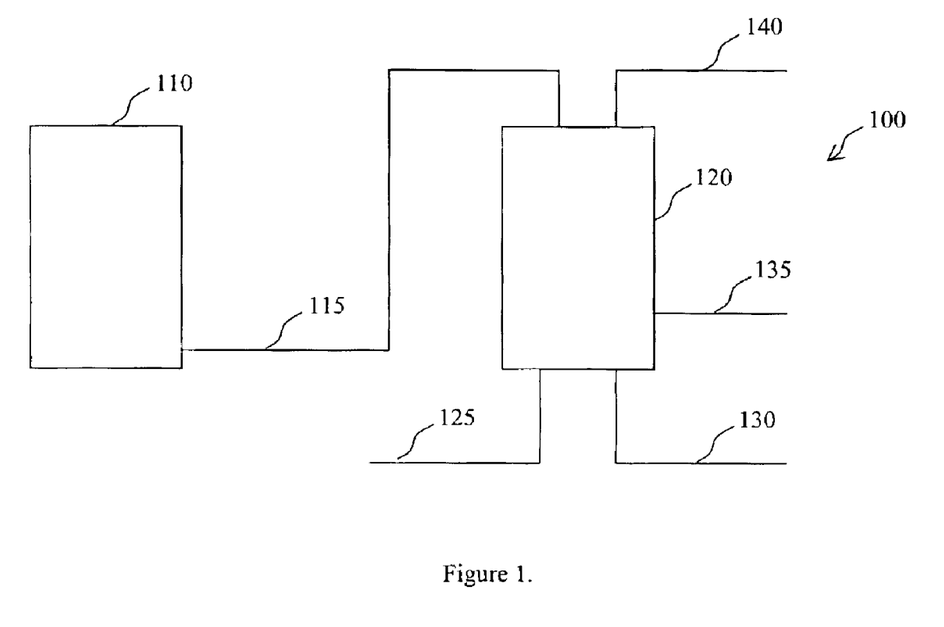
FIG. 1 is a flow diagram in accordance with the present invention.

FIG. 1 is a schematic diagram of a preferred embodiment of the present invention. The schematic includes only those elements relevant to the preferred embodiment, thus, other elements may be present without departing from the spirit of the invention. According to this embodiment, a reactor system 100 comprises a synthesis reactor 110 and a regeneration vessel 120. A flow line 115 connects synthesis reactor 110 and regeneration vessel 120 such that deactivated catalyst material, preferably catalyst containing slurry, can be transferred back and forth between the two vessels. Regeneration vessel 120 also comprises several other means for introducing or removing gases and/or liquids. For example, line 125 is a means for introducing a stripping gas, line 130 is a means for introducing a regeneration gas, line 135 is a means for introducing an additional liquid and line 140 is a means for removing gases.

A portion of the deactivated catalyst within synthesis reactor 110, i.e., such as a Fischer-Tropsch, methanol and higher alcohols, type reactor, is removed via line 115 as a slurry and introduced into regeneration vessel 120, such as a second synthesis reactor or any vessel capable of enduring the regeneration process. A dry gas is introduced via line 125 into regeneration vessel 120 to prepare or treat the deactivated catalyst slurry. The dry gas helps strip the catalyst slurry of water and entrapped gas bubbles and to remove water adsorbed on the surface of the catalyst material. The deactivated catalyst slurry is contacted with a hydrogen rich gas, introduced via line 130, under conditions effective to regenerate or enhance the activity of the catalyst material. In addition, it is preferred that the catalyst solid concentration in the slurry remain stable throughout the process. The slurry will have a tendency to become more concentrated because light liquids will volatilize or otherwise escape during stripping and/or hydrogen treatment. Thus, additional liquid, preferably heavy hydrocarbons, may be added via line 135 to maintain the solids concentration of the slurry.

In the most preferred embodiment, the synthesis reactor will comprise a Fischer-Tropsch reactor. Any Fischer-Tropsch technology and/or methods known in the art will suffice, however, a multiphase slurry bubble reactor is preferred. The Fischer-Tropsch feedstock is hydrogen and carbon monoxide, i.e., syngas. The hydrogen to carbon monoxide molar ratio is generally deliberately adjusted to a desired ratio of approximately 2:1, but can vary between 0.5 and 4. The syngas is contacted with the Fischer-Tropsch catalyst as it bubbles through the slurry. Fischer-Tropsch catalysts are well known in the art and generally comprise a catalytically active metal, a promoter and a support structure. The most common catalytic metals are Group 8, 9 and 10 of the periodic table metals, such as cobalt, nickel, ruthenium, and iron or mixtures thereof. The support is generally alumina, silica, titania, zirconia or mixtures thereof. As the syngas feedstock contacts the catalyst, the hydrocarbon synthesis reaction takes place. Over time the Fischer-Tropsch catalyst material can become deactivated or lose its ability to enhance reaction rates.

The transfer of the deactivated catalyst from the synthesis reactor 110 may be accomplished in any way known in the art. Transfer mechanisms are not critical to the present invention. For example, the slurry may be transferred by establishing a pressure differential between the vessels, by pumping or by gravity. It is preferred that the slurry not significantly drop in temperature during the transfer because adding heat later would require additional costs to the system. However, the transfer temperature is not critical to the effectiveness of the present invention. For example, even a cooled and solidified slurry mixture could be physically transferred to a regeneration vessel and then re-liquefied for processing.

As stated above, the deactivated catalyst slurry is transferred into regeneration vessel 120. Regeneration vessel 120 can be a vacant, secondary or backup hydrocarbon synthesis reactor or any vessel capable of enduring the temperature and pressure conditions of the regeneration process and capable of treating the desired capacity of the slurry inventory. Several preferred vessel capacities are herein disclosed, however, the capacity of the vessel will ultimately depend upon the desired function, potential use and/or overall size of the plant. For example, there may be a plurality of Fischer-Tropsch reactors in a plant design that require catalyst regeneration. The design may provide that each Fischer-Tropsch reactor have a separate regeneration vessel and thus, only a 1 to about 25% capacity of the reactor inventory may be preferred. Alternatively, it is also possible that multiple Fischer-Tropsch reactors may feed into a single regeneration vessel and, thus, a larger capacity of up to 100% of a single reactor inventory may be preferred. The exact percentages are not critical. They are intended only as an illustration that certain designs can use multiple smaller vessels that may ultimately be more cost effective than a single larger vessel. In a preferred embodiment, vessel 120 may also be equipped with a heating or cooling means (not shown), such as internal or external coils where a heating or cooling medium maybe circulated.

The stripping gas may be any gas that satisfies the desired limitation on water content. For example, the gas may be any available gas from existing processes at the plant. Suitable stripping gases include but are not limited to methane rich gas, nitrogen, hydrogen rich gas, hydroprocessing tail gas, hydrogen rich gas from olefin production, or any combination of sources. In addition, the stripping gas may come from an outside source such as bottled gases prepared off-site.

Another consideration for the stripping gas is that it should not significantly react with the slurry or catalyst material within the slurry to form new products. It should be appreciated however that some reaction is contemplated and expected. For example, a small amount of syngas may be present in the gas to help increase the temperature of the slurry vessel and contents. The syngas will react due to the catalyst present to form additional Fischer-Tropsch products. Because of the reaction's exothermic nature, additional heat will be added to the system. Significant reaction is preferably avoided, however, because new water may be formed as a by-product, which would be counterproductive to the stripping process. Thus, the stripping process must be able to overcome any additional water being produced in any reactions between the stripping gas selected and the slurry or catalyst material.

The stripping process is preferably carried out at operating conditions close to the synthesis reactor operating conditions. For example, a stripping process of a catalyst slurry from a Fischer-Tropsch reactor should be operated from about 200° C. to about 350° C., preferably from about 210° C. to about 250° C. It is preferred that the operating pressures of the stripping process be equal to or lower than the operating pressure in the preceding synthesis or Fischer-Tropsch reactor, more preferably 20 psia lower than the synthesis or Fischer-Tropsch reactor. The process can be carried out at pressures from about 25 psia to about 450 psia, more preferably from about 50 psia to about 200 psia and still more preferably from about 50 psia to about 125 psia. Depending upon the catalyst, flow rates, slurry volume and operating conditions the stripping process should take from about 0.5 hours to about 48 hours. The use of relatively low operating pressures for the stripping step is a featured advantage of the present invention.

The regeneration process is preferably carried out by introducing a hydrogen containing gas into the regeneration vessel containing the deactivated catalyst slurry. The hydrogen containing gas may come from any available source including but not limited to bottled hydrogen, tail gas from a hydroprocessing unit like a hydrotreater or a hydrocracker, hydrogen from an integrated or stand alone olefins production unit, a hydrogen plant, tail gas from a Fischer-Tropsch reactor, hydrogen produced by removal from syngas (e.g., using a slip stream of syngas to produce hydrogen via chemical or physical means such as a membrane separation or pressure swing adsorption unit) or any combination thereof. The more preferred gases are pure hydrogen, hydrogen and methane mixtures and hydrogen and nitrogen mixtures. The concentration of pure hydrogen in the streams is not critical but will affect the time it takes for a volume of gas to regenerate the deactivated catalyst. The purity of the gases is also not critical but deleterious impurities should be minimized or avoided as much as possible. For example, it is preferred that, carbon monoxide be less than about 5 mole %, and water less than about 10%, more preferably less than about 5%, most preferably less than about 1%.

The regeneration process is preferably carried out at temperatures that are different than the synthesis reactor operating conditions. For example, in a preferred embodiment, a regeneration process of a catalyst slurry from a Fischer-Tropsch reactor is operated at from about 220° C. to about 350° C., preferably from about 250° C. to about 330° C. and more preferably from about 270° C. to about 320° C. It is believed that this represents an optimum temperature range for regeneration of catalysts as described herein. It should be appreciated that varying the other operating parameters will skew the optimum temperature range, however, this temperature range is preferred.

It is preferred that the operating pressures of the regeneration process be equal to or lower than the operating pressure in the preceding synthesis or Fischer-Tropsch reactor, more preferably 20 psia lower than the synthesis or Fischer-Tropsch reactor. The process can be carried out at pressures from about 25 psia to about 450 psia, more preferably from about 50 psia to about 200 psia and still more preferably from about 50 psia to about 125 psia. One of the features of the present invention is the ability to regenerate a deactivated catalyst at relatively low pressures. Depending upon the catalyst, flow rates, slurry volume and operating conditions, the regeneration process will take from about 0.5 hours to about 48 hours. The stripping step is preferably done before the regeneration step but it can be done simultaneously, i.e., in a single step stripping/regeneration process.

The preferred conditions for the single step process include operating at temperatures of from about 220° C. to about 350° C., more preferably from about 220° C. to about 330° C., and still more preferably from about 220° C. to about 300° C. It is preferred that the operating pressures of the single step embodiment be equal to or lower than the operating pressure in the preceding synthesis or Fischer-Tropsch reactor, more preferably 20 psia lower than the synthesis or Fischer-Tropsch reactor. The process can be carried out at pressures from about 25 psia to about 450 psia, more preferably from about 50 psia to about 200 psia and still more preferably from about 50 psia to about 125 psia. As with all embodiments, the preferences for the gases are consistent, i.e., % water, % CO, etc., and remain as described herein.

Because the operating temperature of both the stripping and regeneration or hydrogen treatment processes can be higher than the synthesis reactor, some of the lighter hydrocarbons and other low boiling point liquids will be removed from the slurry. This loss of liquid may lead to an increased concentration of the solids content. It is preferred that the solid content not increase by more than about 20% by weight or volume and more preferably not more than about 10% by weight or volume from the original concentration in the synthesis reactor. For example, if the solids concentration being transferred from the synthesis reactor is 30% by volume or weight then the concentration should preferably not exceed about 36% on the same basis and more preferably 33%.

If desired, the solids concentration may be maintained by adding a heavy makeup liquid or heavy hydrocarbon to replace liquid lost or vaporized during the process. It is preferred that the heavy makeup liquid comprise Fischer-Tropsch heavy wax, Fischer-Tropsch wax or heavy liquid from the separation columns or towers. However, the exact liquid is not critical as long as it does not interfere with the catalyst activity or the ability to re-introduce the slurry into a synthesis reactor. It is also preferred that the initial boiling point of the heavy makeup liquid should be higher than the operating temperature of the regeneration process so that it does not volatilize during further processing.

Figure 2:
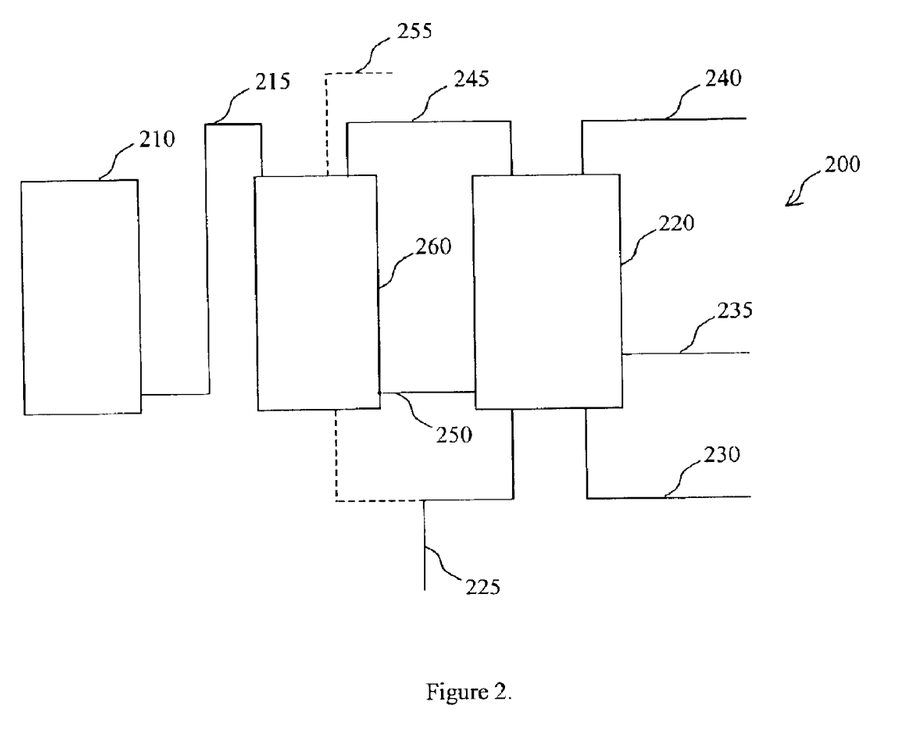
FIG. 2 is a flow diagram of an alternative embodiment in accordance with the present invention that includes a storage or blending tank.

In an alternative embodiment, as shown in FIG. 2, the regeneration system 200 includes an intermediate storage/blending tank 260. In this embodiment the transfer of the slurry from the synthesis reactor 210 will be to the intermediate storage/blending vessel 260 via line 215. It should also be appreciated that in this embodiment catalyst containing slurry can be introduced into vessel 260 from multiple sources, e.g., more than one synthesis reactor. The stripping process can take place in vessel 260 or as described above in the regeneration vessel 220. The stripping gas would be introduced into the appropriate vessel using line 225. Alternatively, the stripping gas may be contacted with the slurry in both vessels simultaneously. In this case, any entrapped or generated gases in stripping vessel 260 and/or regeneration vessel 220 could escape through outlet line 255 and/or 240, respectively. The slurry would be transferred from vessel 260 to the regeneration vessel 220 via line 245.

A regeneration or hydrogen rich gas would be introduced via line 230, under conditions effective to regenerate or enhance the activity of the catalyst material. The additional make up liquid, preferably heavy hydrocarbons, would be added via line 235 to maintain the solids concentration of the slurry. Any entrapped or generated gases could escape through outlet line 240. The treated catalyst could be transferred back to vessel 260 via line 250.

This embodiment also allows for a semi-continuous regeneration process in which the slurry is circulated in a loop between vessel 260 and regeneration vessel 220 until the catalyst is adequately treated. The amount of treating would ultimately depend upon many factors, including but not limited to the catalyst composition being treated and the overall operation of the system. Once treated the slurry can be transferred back to the synthesis reactor 210 either by reversing flow of 215 or by a separate distribution line (not shown). Reversing flow is easily achieved using modern pumps and valves or by establishing a pressure differential between the vessels involved or by other techniques well known in the art. In addition, it should also be appreciated that the distribution of the treated catalyst may be to multiple destinations, e.g., more than one synthesis reactor.

Once the catalyst has been regenerated or treated, it can be transferred back into the synthesis reactor of origin or distributed into other synthesis reactors as desired. The catalyst that has been treated in accordance with the present invention recovers much if not all of the lost activity. The following examples are indicative of the present invention.

General Procedure for Regeneration:

Regeneration processes in accordance with the present invention were carried out in-situ in a typical Fischer-Tropsch slurry type reactor to simulate the external regeneration vessel. The regeneration processes included one or more of the following steps: (1) a stripping step using hydrogen at reaction temperature and a pressure lower than the Fischer-Tropsch reactor pressure, and (2) a reactivation step using hydrogen at a temperature above the Fischer-Tropsch reaction temperature and a pressure lower than the Fischer-Tropsch reaction pressure.

The Fischer-Tropsch reaction was stopped by shutting off the flow of carbon monoxide. This was followed by changing the flow rate of hydrogen, if needed, and lowering the pressure in the reactor. One or both of the above two steps followed. After regeneration, the reactor was cooled to reaction temperature and pressurized under hydrogen flow to reaction pressure. Hydrogen flow was changed as needed and carbon monoxide was re-established. Carbon monoxide conversions were measured for 4 and 24 hours after the reaction started. Subsequently, carbon monoxide conversions were measured once every 24 hours.

EXAMPLE 1

Figure 3:
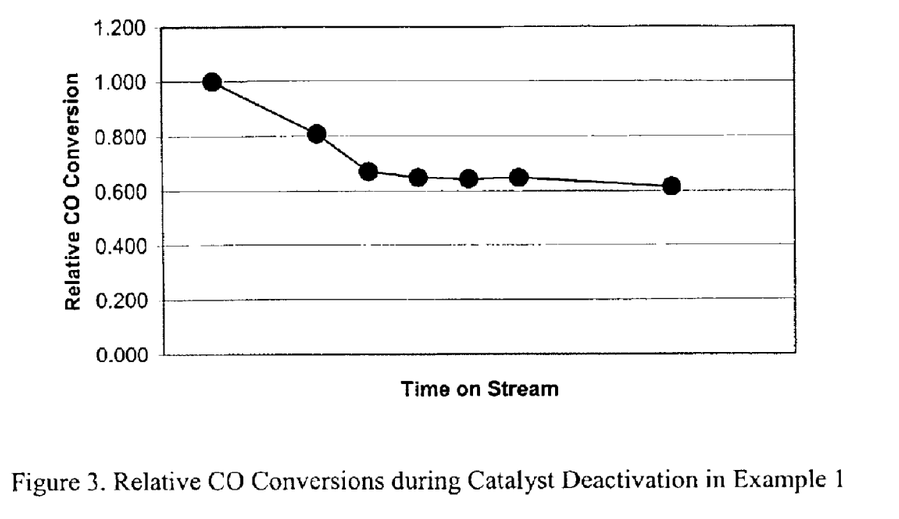
FIG. 3 is a graph that shows the relative CO conversion values of a particular catalyst material during catalyst deactivation.

A Fischer-Tropsch reaction was carried out over a cobalt based catalyst in a 600 cc continuous-flow slurry stirred tank reactor at 225° C., 350 psig, a syngas space velocity of 6 NL/hr/gram of catalyst and an inlet $H_2/CO$ ratio of 2.0. FIG. 3 shows a plot of the relative carbon monoxide conversion (initial carbon monoxide conversion=1) with time on stream. This is a typical plot illustrating catalyst deactivation with time for a Fischer-Tropsch catalyst. There is an initial period of rapid deactivation followed by a subsequent relatively slow period of deactivation. As shown in FIG. 3, the relative carbon monoxide conversion is 0.62 at the end of the run.

EXAMPLE 2

A Fischer-Tropsch reaction was carried out over a cobalt based catalyst in a 1 liter continuous-flow slurry stirred tank reactor at 220° C., 350 psig, a syngas space velocity of 7.9

NL/hr/gram of catalyst and an inlet $H_2/CO$ ratio of 2.0. Further, inert argon gas was co-fed with syngas to the reactor such that 16.5 mole percent of the total reactor feed was argon. After the catalyst had reached a steady state CO conversion for 140 hours, water was co-fed to the reactor along with the syngas/argon. After 48 hours of water co-feed, the amount of water flow was increased. There were four such increases in the flow rate of water. Each increase was followed by 48 hours of constant water flow. During water co-feed, the flow rate of argon was decreased proportionately such that the total mole fraction of water and argon was maintained at 16.5 mole percent of reactor feed (balance syngas).

The CO conversion decreased during the co-feeding of water. Table 1 shows the relative CO conversion of the catalyst 48 hours after the addition of water at the four different flow rates of water used. The water flow rate is quantified by the mole fraction of water at the entrance of the reactor. The data shows that water is a major cause of deactivation of the Fischer-Tropsch catalyst. It has been shown in the literature (see, for example, HILMEN, SCHANKE ET AL., Applied Catalysis, 186 (1999) 169–188) that water oxidizes the cobalt active metal to inactive cobalt oxide.

TABLE 1

Effect of co-feeding water on Relative carbon monoxide conversions

| Mole % of Water in Reactor Feed | Relative CO Conversion |
|---|---|
| 0.0 | 1.00 |
| 1.6 | 0.99 |
| 4.9 | 0.87 |
| 8.8 | 0.75 |
| 11.2 | 0.66 |

EXAMPLE 3

Figure 4:
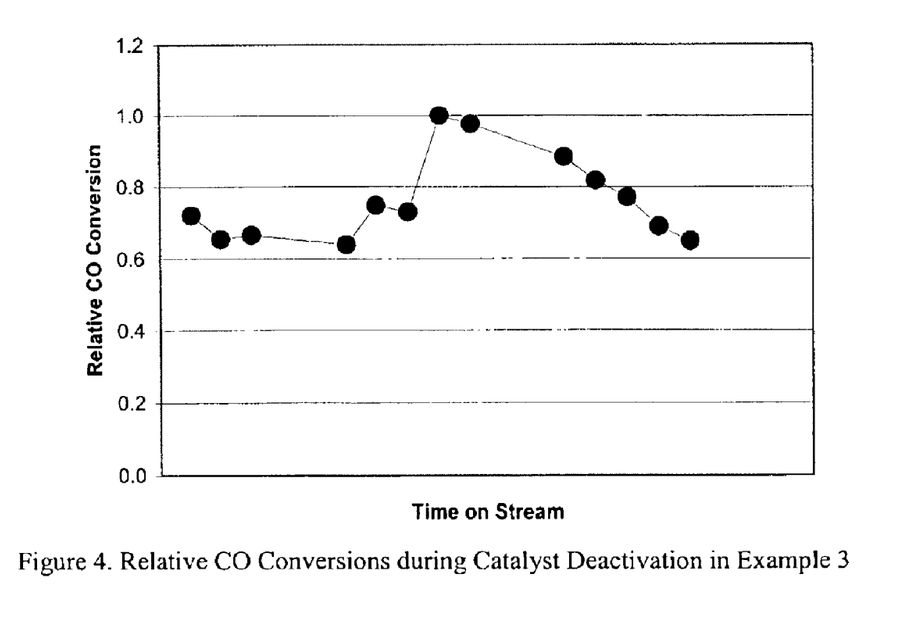
FIG. 4 is a graph that shows the relative CO conversion values of a particular catalyst material during catalyst deactivation.

A Fischer-Tropsch reaction was carried out over a cobalt based catalyst in a 1 liter continuous-flow slurry stirred tank reactor at 225° C., 350 psig, a syngas space velocity of 9.0 NL/hr/gram of catalyst and an inlet $H_2/CO$ ratio of 2.0. After steady state CO conversion was reached at these conditions, the space velocity was decreased to 5.5 NL/hr/gram of catalyst. The CO conversion immediately increased to a higher value but subsequently decreased due to catalyst deactivation to a lower value. The relative CO conversion of the catalyst is taken as 1.0 at the highest CO conversion. FIG. 4 shows the relative CO conversion of the catalyst with time on stream. The catalyst after deactivation reached a relative CO conversion of 0.65.

This is one more example of catalyst deactivation caused by high values of carbon monoxide conversion. Note that the concentration of water, a product of the Fischer-Tropsch reaction, is higher at higher CO conversion.

EXAMPLE 4

A regeneration procedure was carried out on catalyst material deactivated as described in Example 1. The regeneration was carried out inside the Fischer-Tropsch reactor in two steps—stripping and reactivation. In the first step (stripping), the flow of syngas to the reactor was stopped and the flow of hydrogen was started at a flow rate of 4 NL/hour/gram of catalyst. The reactor pressure was decreased to 100 psig. The reactor was maintained at the same temperature as during the Fischer-Tropsch reaction (225° C.) for 2 hours. In the second step (reactivation), the reactor temperature was increased to 300° C. at the rate of 1° C. per minute. The reactor was maintained at this temperature of 300° C. for 16 hours.

After the regeneration, the reactor was cooled to the earlier Fischer-Tropsch reaction temperature of 225° C., the reactor was pressurized to the earlier Fischer-Tropsch pressure of 350 psig, hydrogen flow was stopped and syngas flow re-started at the earlier space velocity of 6 NL/hr/gram of catalyst. The CO conversion was measured after 4 and 24 hours after the Fischer-Tropsch reaction was re-started.

EXAMPLE 5

A regeneration procedure was carried out on catalyst material deactivated as described in Example 1. The regeneration was carried out inside the Fischer-Tropsch reactor in two steps—stripping and reactivation. In the first step (stripping), the flow of syngas to the reactor was stopped and the flow of hydrogen was started at a flow rate of 4 NL/hour/gram of catalyst. The reactor pressure was decreased to 100 psig. The reactor was maintained at the same temperature as during the Fischer-Tropsch reaction (225° C.) for 24 hours. In the second step (reactivation), the reactor temperature was increased to 300° C. at the rate of 1° C. per minute. The reactor was maintained at this temperature of 300° C. for 16 hours.

After the regeneration, the reactor was cooled to the earlier Fischer-Tropsch reaction temperature of 225° C., the reactor was pressurized to the earlier Fischer-Tropsch pressure of 350 psig, hydrogen flow was stopped and syngas flow re-started at the earlier space velocity of 6 NL/hr/gram of catalyst. The CO conversion was measured after 4 and 24 hours after the Fischer-Tropsch reaction was re-started.

EXAMPLE 6

A regeneration procedure was carried out on catalyst material deactivated as described in Example 3. The regeneration was carried out inside the Fischer-Tropsch reactor in two steps—stripping and reactivation. In the first step (stripping), the flow of syngas to the reactor was stopped and the flow of hydrogen was started at a flow rate of 4 NL/hour/gram of catalyst. The reactor pressure was decreased to 100 psig. The reactor was maintained at the same temperature as during the Fischer-Tropsch reaction (225° C.) for 24 hours. In the second step (reactivation), the reactor temperature was increased to 300° C. at the rate of 1° C. per minute. The reactor was maintained at this temperature of 300° C. for 16 hours.

After the regeneration, the reactor was cooled to the earlier Fischer-Tropsch reaction temperature of 225° C., the reactor was pressurized to the earlier Fischer-Tropsch pressure of 350 psig, hydrogen flow was stopped and syngas flow re-started at the earlier space velocity of 6 NL/hr/gram of catalyst. The CO conversion was measured after 4 and 24 hours after the Fischer-Tropsch reaction was re-started.

EXAMPLE 7

A Fischer-Tropsch reaction was carried out using a cobalt based catalyst under conditions that slowly deactivate the catalyst from an initial relative CO conversion of 1.0 to a relative CO conversion of 0.77. The regeneration was carried out inside the Fischer-Tropsch reactor. Only the stripping step was used. In the stripping step, the flow of syngas to the reactor was stopped and the flow of hydrogen was started at a flow rate of 4 NL/hour/gram of catalyst. The reactor pressure was decreased to 70 psig. The reactor was maintained at the same temperature as during the Fischer-Tropsch reaction (230° C.) for 16 hours.

After the regeneration, the reactor was pressurized to the earlier Fischer-Tropsch pressure of 350 psig, the hydrogen flow was stopped and syngas flow re-started at the earlier space velocity of 6 NL/hr/gram of catalyst. The CO conversion was measured after 4 and 24 hours after the Fischer-Tropsch reaction was re-started.

EXAMPLE 8

After catalyst deactivation and an attempted regeneration in Example 7, another attempt was made to regenerate the catalyst. The regeneration was carried out inside the Fischer-Tropsch reactor. Only the stripping step was used. In the stripping step, the flow of syngas to the reactor was stopped and the flow of hydrogen was started at a flow rate of 4 NL/hour/gram of catalyst. The reactor pressure was decreased to 70 psig. The reactor was maintained at the same temperature as during the Fischer-Tropsch reaction (230° C.) for 48 hours.

After the regeneration, the reactor was pressurized to the earlier Fischer-Tropsch pressure of 350 psig, the hydrogen flow was stopped and syngas flow re-started at the earlier space velocity of 6 NL/hr/gram of catalyst. The CO conversion was measured after 4 and 24 hours after the Fischer-Tropsch reaction was re-started.

EXAMPLE 9

After catalyst deactivation and the successful regeneration and re-deactivation in Example 8, another attempt was made to regenerate the catalyst. The regeneration was carried out inside the Fischer-Tropsch reactor. Only the stripping step was followed. In the stripping step, the flow of syngas to the reactor was maintained the same as during reaction at 6 NL/hr/gram of catalyst. The reactor pressure was decreased to 70 psig. The reactor was maintained at the same temperature as during the Fischer-Tropsch reaction (230° C.) for 48 hours.

After the regeneration, the reactor pressure was increased to its original value of 350 psig. The CO conversion was measured after 4 and 24 hours after the Fischer-Tropsch reaction was re-started.

The regeneration conditions and results of the Examples are summarized in Table 2 below.

cursor for the regeneration step, should be carried out for greater than 2 hours if conducted at 225° C. and 100 psia. Likewise, a stand alone stripping process at 230° C. and 70 psia should be carried out for greater than 16 hours. Of course, changing the other stripping operating conditions may alter the results. For example, the Examples represented in Table 2 were carried out at the preferred optimum temperature ranges. Using similar operating parameters, higher temperatures, e.g., greater than 350° C., may actually lower the CO conversion value of the catalyst material.

Also, the data from Example 9 shows that the gas used for stripping does not necessarily have to be high-purity hydrogen. In fact, the stripping gas may contain up to about 33 mole % of carbon monoxide, but it is preferred that the carbon monoxide be less than about 30 mole %, more preferably less than about 20 mole %, and still more preferably less than about 10 mole %. Further, since it is very likely that there was some amount of reaction occurring during stripping, this shows that under at least the conditions presented the reaction is not detrimental to the stripping/regeneration procedure.

The above described regeneration process naturally provides an improved process for Fischer-Tropsch production and ultimately an improved method for the conversion of hydrocarbon gas to liquids. Both benefits are based on the fact that the present invention provides a means for obtaining a longer catalyst lifetime as well as a more practical means for regenerating synthesis catalysts wherein the catalysts have been deactivated by multiple mechanisms. The conversion of hydrocarbon gas to liquids in accordance with the present invention involves first the preparation of the hydrocarbon synthesis gas feedstocks followed by the hydrocarbon synthesis reaction and regeneration process. The hydrocarbon synthesis reaction, preferably a Fischer-Tropsch reaction, and the regeneration process are already described above. The preparation of the Fischer-Tropsch feedstock, i.e., syngas, is described below.

According to the present invention, a syngas reactor can comprise any of the synthesis gas technology and/or methods known in the art. The hydrocarbon-containing feed is almost exclusively obtained as natural gas. However, the most important component is generally methane. Methane or other suitable hydrocarbon feedstocks (hydrocarbons

TABLE 2

Regeneration Conditions and Results of Examples 4 to 13

| | Regeneration Conditions | | | | | | | | Relative CO Conversion | | |
|---|---|---|---|---|---|---|---|---|---|---|---|
| | Stripping | | | | Reactivation | | | | | | |
| Example # | Temp. deg. C | Press. psig | Time hrs | Gas Used | Temp. deg. C | Press. psig | Time hrs | Gas Used | Initial | Before Regen | After Regen |
| 4 | 225 | 100 | 2 | H2 | 300 | 100 | 16 | H2 | 1 | 0.62 | 0.62 |
| 5 | 225 | 100 | 24 | H2 | 300 | 100 | 16 | H2 | 1 | 0.62 | 1.02 |
| 6 | 225 | 100 | 24 | H2 | 300 | 100 | 16 | H2 | 1 | 0.65 | 1.05 |
| 7 | 230 | 70 | 16 | H2 | — | — | — | — | 1 | 0.77 | 0.77 |
| 8 | 230 | 70 | 48 | H2 | — | — | — | — | 1 | 0.77 | 1 |
| 9 | 230 | 70 | 48 | H2/CO 2:1 | — | — | — | — | 1 | 0.77 | 1 |

The data in Table 2 shows that the regeneration process in accordance with the present invention restores a deactivated catalyst to its original CO conversion values or better. Examples 4 and 7 showed no indication of regeneration for the deactivated catalyst material. It is believed that the data suggests that the stripping procedure, when used as a prewith four carbons or less) are also readily available from a variety of other sources such as higher chain hydrocarbon liquids, coal, coke, hydrocarbon gases, etc., all of which are clearly known in the art. Similarly, the oxygen-containing gas may come from a variety of sources and will be somewhat dependent upon the nature of the reaction being used. For example, a partial oxidation reaction requires diatomic oxygen as a feedstock while steam reforming requires only steam. According to the preferred embodiment of the present invention, partial oxidation is assumed for at least part of the syngas production reaction.

Regardless of the sources, the hydrocarbon-containing feed and the oxygen-containing feed are reacted under catalytic conditions. The catalyst compositions useful for synthesis gas reactions are well known in the art. They generally are comprised of a catalytic metal. The most common catalytic metals are Group 8, 9 and 10 of the periodic table metals. The support structures may be monoliths and particulates. Often, the support selected will dictate the type of catalyst bed that must be used. For example, fixed beds are comprised of monoliths and large particle sized supports. Supports comprised of small particles tend to be more useful in fluidized beds. The support matrix is usually a metal oxide or mixture of metal oxides, such as alumina, silica, titania, zirconia or the like.

The synthesis gas feedstocks are generally preheated, mixed and passed over or through the catalyst beds. As the mixed feedstocks contact the catalyst the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or oxygen. The synthesis gas product, i.e., syngas, is then ready to be used, treated, or directed to its intended purpose. For example, in the instant case some or all of the syngas will be used as a feedstock for the Fischer-Tropsch process.

While preferred embodiments of this invention have been shown and described, modification thereof can be made by one skilled in the art without departing from the spirit or teaching of this invention. The embodiments described herein are exemplary only and are not limiting. Many variations and modifications of the processes are possible and are within the scope of this invention. For example, it is possible that the stripping gas and regeneration gas are the same. The stripping gas does not have to include hydrogen but the regeneration gas will preferably include hydrogen. Accordingly, the scope of protection is not limited to the embodiments described herein, but is only limited by the claims that follow, the scope of which shall include all equivalents of the subject matter of the claims. For example, although the term regeneration is frequently used the term "treatment" would also be an adequate description and should be interchangeably understood. In addition, unless order is explicitly recited, the recitation of steps in a claim is not intended to require that the steps be performed in any particular order, or that any step must be completed before the beginning of another step.

What is claimed is:

1. A process for treating catalyst slurry having a CO conversion value from a synthesis reactor wherein said catalyst slurry comprises water comprising:
    (a) contacting a catalyst slurry with a stripping gas at a pressure equal to or lower than the synthesis reactor operating pressure wherein at least a portion of the water is removed from the catalyst slurry; and
    (b) contacting said catalyst slurry in step (a) with a hydrogen containing gas under conditions and for a period of time sufficient to increase the CO conversion value of the catalyst slurry.

2. The process according to claim 1 wherein the stripping gas is contacted with the catalyst slurry at a temperature from about 200° C. to about 350° C. and a pressure from about 25 psia to about 450 psia.

3. The process according to claim 1 wherein the stripping gas is contacted with the catalyst slurry at a temperature from about 210° C. to about 250° C. and a pressure from about 50 psia to about 200 psia.

4. The process according to claim 1 wherein the stripping gas is contacted with the catalyst slurry at a temperature from about 210° C. to about 250° C. and a pressure from about 50 psia to about 125 psia.

5. The process according to claim 1 wherein the stripping gas comprises less than about 10 mole percent water.

6. The process according to claim 5 wherein the stripping gas comprises less than about 10 mole percent carbon monoxide.

7. The process according to claim 1 wherein the stripping gas comprises less than about 5 mole percent water.

8. The process according to claim 1 wherein the stripping gas comprises less than about 1 mole percent water.

9. The process according to claim 1 wherein step (a) is carried out in a Fischer-Tropsch synthesis reactor.

10. The process according to claim 1 wherein the hydrogen containing gas is contacted with the catalyst slurry at a temperature from about 220° C. to about 350° C. and a pressure from about 25 psia to about 450 psia.

11. The process according to claim 1 wherein the hydrogen containing gas is contacted with the catalyst slurry at a temperature from about 250° C. to about 330° C. and a pressure from about 50 psia to about 200 psia.

12. The process according to claim 1 wherein the hydrogen containing gas is contacted with the catalyst slurry at a temperature from about 250° C. to about 330° C. and a pressure from about 50 psia to about 125 psia.

13. The process according to claim 1 wherein the hydrogen containing gas comprises less than about 10 mole percent water.

14. The process according to claim 13 wherein the hydrogen containing gas comprises less than about 10 mole percent carbon monoxide.

15. The process according to claim 1 wherein the hydrogen containing gas comprises less than about 5 mole percent water.

16. The process according to claim 1 wherein the hydrogen containing gas comprises less than about 1 mole percent water.

17. The process according to claim 1 wherein step (b) is carried out in a Fischer-Tropsch synthesis reactor.

18. The process according to claim 1 wherein the synthesis reactor is a Fischer-Tropsch reactor.

19. The process according to claim 1 wherein the catalyst comprises a metal selected from the group consisting of Group 8, 9, 10 metals and mixtures thereof.

20. The process according to claim 1 wherein the catalyst comprises cobalt.

21. The process according to claim 1 wherein step (b) is carried out at a higher temperature than the operating temperature of said synthesis reactor.

22. The process according to claim 1 wherein both step (a) and (b) are carried out at a higher temperature than the operating temperature of said synthesis reactor.

23. The process according to claim 1 wherein step (a) is carried out at a pressure lower than the synthesis reactor operating pressure.

24. The process according to claim 23 wherein step (a) is carried out at a pressure at least 20 psia lower than the synthesis reactor operating pressure.

25. The process according to claim 23 wherein step (a) is carried out at a pressure from about 50 psia to about 125 psia provided the synthesis reactor operating pressure is greater than about 145 psia.

26. The process according to claim 1 wherein step (b) is carried out at a pressure lower than the synthesis reactor operating pressure.

27. The process according to claim 26 wherein step (b) is carried out at a pressure at least 20 psia lower than the synthesis reactor operating pressure.

28. The process according to claim 26 wherein step (b) is carried out at a pressure from about 50 psia to about 125 psia provided the synthesis reactor operating pressure is greater than about 145 psia.

29. A process for treating a catalyst slurry having a CO conversion value from a synthesis reactor comprising:
  (a) transferring at least a portion of the catalyst slurry to an intermediate vessel;
  (b) transferring at least a portion of the catalyst slurry from step (a) to a regeneration vessel;
  (c) contacting at least a portion of the catalyst slurry with a stripping gas at a pressure equal to or lower than the synthesis reactor operating pressure and under conditions and for a period of time sufficient to remove at least a portion of the water; and
  (d) contacting at least a portion of the catalyst slurry with a hydrogen containing gas under conditions and for a period of time sufficient to increase the CO conversion value of the catalyst slurry.

30. The process according to claim 29 wherein the stripping gas is contacted with the catalyst slurry at a temperature from about 200° C. to about 350° C. and a pressure from about 25 psia to about 450 psia.

31. The process according to claim 29 wherein the stripping gas is contacted with the catalyst slurry at a temperature from about 210° C. to about 250° C. and a pressure from about 50 psia to about 200 psia.

32. The process according to claim 29 wherein the stripping gas is contacted with the catalyst slurry at a temperature from about 210° C. to about 250° C. and a pressure from about 50 psia to about 125 psia.

33. The process according to claim 29 wherein the stripping gas comprises less than about 10 mole percent water.

34. The process according to claim 33 wherein the stripping gas comprises less than about 10 mole percent carbon monoxide.

35. The process according to claim 29 wherein the stripping gas comprises less than about 5 mole percent water.

36. The process according to claim 29 wherein the stripping gas comprises less than about 1 mole percent water.

37. The process according to claim 29 wherein step (c) is carried out in a synthesis reactor.

38. The process according to claim 29 wherein the hydrogen containing gas is contacted with the catalyst slurry at a temperature from about 220° C. to about 350° C. and a pressure from about 25 psia to about 450 psia.

39. The process according to claim 29 wherein the hydrogen containing gas is contacted with the catalyst slurry at a temperature from about 250° C. to about 330° C. and a pressure from about 50 psia to about 200 psia.

40. The process according to claim 29 wherein hydrogen containing gas is contacted with the catalyst slurry at a temperature from about 270° C. to about 320° C. and a pressure from about 50 psia to about 125 psia.

41. The process according to claim 29 wherein the hydrogen containing gas comprises less than about 10 mole percent water.

42. The process according to claim 41 wherein the hydrogen containing gas comprises less than about 10 mole percent carbon monoxide.

43. The process according to claim 29 wherein the hydrogen containing gas comprises less than about 5 mole percent water.

44. The process according to claim 29 wherein the hydrogen containing gas comprises less than about 1 mole percent water.

45. The process according to claim 29 wherein step (d) is carried out in a synthesis reactor.

46. The process according to claim 29 wherein the synthesis reactor is a Fischer-Tropsch reactor.

47. The process according to claim 29 wherein the catalyst comprises a metal selected from the group consisting of Group 8, 9, 10 metals and mixtures thereof.

48. The process according to claim 29 wherein the catalyst comprises cobalt.

49. The process according to claim 29 wherein step (d) is carried out at a higher temperature than the operating temperature of said synthesis reactor.

50. The process according to claim 29 wherein both step (c) and (d) are carried out at a higher temperature than the operating temperature of said synthesis reactor.

51. The process according to claim 29 wherein the intermediate vessel and the regeneration vessel are the same vessel.

52. The process according to claim 29 wherein the stripping process of step (c) is carried out in the intermediate vessel.

53. The process according to claim 52 wherein the stripping process of step (d) is carried out in the regeneration vessel.

54. The process according to claim 53 wherein the catalyst slurry is continuously circulated between the intermediate and regeneration vessels for a period of time sufficient to treat the catalyst slurry.

55. The process according to claim 29 wherein the stripping process of step (c) is carried out in the regeneration vessel.

56. The process according to claim 29 wherein step (c) is carried out at a pressure lower than the synthesis reactor operating pressure.

57. The process according to claim 56 wherein step (c) is carried out at a pressure at least 20 psia lower than the synthesis reactor operating pressure.

58. The process according to claim 56 wherein step (c) is carried out at a pressure from about 50 psia to about 125 psia provided the synthesis reactor operating pressure is greater than about 145 psia.

59. The process according to claim 29 wherein step (d) is carried out at a pressure lower than the synthesis reactor operating pressure.

60. The process according to claim 59 wherein step (d) is carried out at a pressure at least 20 psia lower than the synthesis reactor operating pressure.

61. The process according to claim 59 wherein step (d) is carried out at a pressure from about 50 psia to about 125 psia provided the synthesis reactor operating pressure is greater than about 145 psia.

62. A process for converting a hydrocarbon-containing feed gas to liquid hydrocarbon products comprising:
  (a) reacting the hydrocarbon-containing gas and an oxygen-containing gas in a syngas reactor under conditions effective to produce a syngas stream;
  (b) reacting at least a portion of the syngas stream of step (a) in a synthesis reactor under conditions effective to produce liquid and gaseous hydrocarbon products and water, wherein the syngas is contacted with a synthesis catalyst slurry and at least a portion of said catalyst is at least partially deactivated as a result;

(c) contacting at least a portion of the deactivated catalyst slurry from step (b) with a stripping gas at a pressure equal to or lower than the synthesis reactor operating pressure and under conditions effective for removing at least a portion of the water from the catalyst slurry; and
(d) contacting at least a portion of the stripped catalyst slurry in step (c) with a hydrogen containing gas under conditions and for a period of time sufficient to at least partially re-activate the catalyst slurry.

63. The process according to claim 62 wherein the stripping gas is contacted with the catalyst slurry at a temperature from about 200° C. to about 350° C. and a pressure from about 25 psia to about 450 psia.

64. The process according to claim 62 wherein the stripping gas is contacted with the catalyst slurry at a temperature from about 210° C. to about 250° C. and a pressure from about 50 psia to about 200 psia.

65. The process according to claim 62 wherein the stripping gas is contacted with the catalyst slurry at a temperature from about 210° C. to about 250° C. and a pressure from about 50 psia to about 125 psia.

66. The process according to claim 62 wherein the stripping gas comprises less than about 10 mole percent water.

67. The process according to claim 62 wherein the stripping gas comprises less than about 5 mole percent water.

68. The process according to claim 62 wherein the stripping gas comprises less than about 1 mole percent water.

69. The process according to claim 62 wherein step (c) is carried out in a Fischer-Tropsch synthesis reactor.

70. The process according to claim 62 wherein the stripping gas comprises less than about 10 mole percent carbon monoxide.

71. The process according to claim 62 wherein the hydrogen containing gas is contacted with the catalyst slurry at a temperature from about 220° C. to about 350° C. and a pressure from about 25 psia to about 450 psia.

72. The process according to claim 62 wherein the hydrogen containing gas is contacted with the catalyst slurry at a temperature from about 250° C. to about 330° C. and a pressure from about 50 psia to about 200 psia.

73. The process according to claim 62 wherein the hydrogen containing gas is contacted with the catalyst slurry at a temperature from about 270° C. to about 320° C. and a pressure from about 50 psia to about 125 psia.

74. The process according to claim 62 wherein the hydrogen containing gas comprises less than about 10 mole percent water.

75. The process according to claim 74 wherein the hydrogen containing gas comprises less than about 10 mole percent carbon monoxide.

76. The process according to claim 62 wherein the hydrogen containing gas comprises less than about 5 mole percent water.

77. The process according to claim 62 wherein the hydrogen containing gas comprises less than about 1 mole percent water.

78. The process according to claim 62 wherein step (d) is carried out in a Fischer-Tropsch synthesis reactor.

79. The process according to claim 62 wherein the synthesis reactor is a Fischer-Tropsch reactor.

80. The process according to claim 62 wherein the catalyst comprises a metal selected from the group consisting of Group 8, 9, 10 metals and mixtures thereof.

81. The process according to claim 62 wherein the catalyst comprises cobalt.

82. The process according to claim 62 wherein step (c) is carried out at a higher temperature than the operating temperature of said synthesis reactor.

83. The process according to claim 62 wherein both step (c) and (d) are carried out at a higher temperature than the operating temperature of said synthesis reactor.

84. The process according to claim 62 wherein step (c) is carried out at a pressure lower than the synthesis reactor operating pressure.

85. The process according to claim 84 wherein step (c) is carried out at a pressure at least 20 psia lower than the synthesis reactor operating pressure.

86. The process according to claim 84 wherein step (c) is carried out at a pressure from about 50 psia to about 125 psia provided the synthesis reactor operating pressure is greater than about 145 psia.

87. The process according to claim 62 wherein step (d) is carried out at a pressure lower than the synthesis reactor operating pressure.

88. The process according to claim 87 wherein step (d) is carried out at a pressure at least 20 psia lower than the synthesis reactor operating pressure.

89. The process according to claim 87 wherein step (d) is carried out at a pressure from about 50 psia to about 125 psia provided the synthesis reactor operating pressure is greater than about 145 psia.

90. A process for treating catalyst slurry having a CO conversion value from a synthesis reactor wherein said catalyst slurry comprises water comprising contacting the catalyst slurry with a hydrogen containing gas at a pressure equal to or lower than the synthesis reactor operating pressure for a period of time sufficient to increase the CO conversion value of the catalyst slurry wherein said hydrogen containing gas comprises less than about 10 mole % water and less than about 33 mole % carbon monoxide.

91. The process according to claim 90 wherein the hydrogen containing gas comprises less than about 5 mole % water.

92. The process according to claim 90 wherein the hydrogen containing gas comprises less than about 1 mole % water.

93. The process according to claim 90 wherein the hydrogen containing gas is contacted with the catalyst slurry at a temperature from about 220° C. to about 350° C. and a pressure from about 25 psia to about 450 psia.

94. The process according to claim 90 wherein the hydrogen containing gas is contacted with the catalyst slurry at a temperature from about 220° C. to about 330° C. and a pressure from about 50 psia to about 200 psia.

95. The process according to claim 90 wherein the hydrogen containing gas is contacted with the catalyst slurry at a temperature from about 220° C. to about 300° C. and a pressure from about 50 psia to about 125 psia.

96. The process according to claim 90 wherein the synthesis reactor is a Fischer-Tropsch reactor.

97. The process according to claim 90 wherein process for treating the catalyst slurry is carried out at a pressure at least 20 psia lower than the synthesis reactor operating pressure.

98. The process according to claim 90 wherein the process for treating the catalyst slurry is carried out at a pressure at a pressure from about 50 psia to about 125 psia provided the synthesis reactor operating pressure is greater than about 145 psia.

99. The process according to claim 90 wherein the hydrogen containing gas comprises less than about 20 mole % carbon monoxide.

100. The process according to claim 90 wherein the hydrogen containing gas comprises less than about 10 mole % carbon monoxide.

* * * * *